United States Patent
Attia et al.

(10) Patent No.: US 7,242,816 B2
(45) Date of Patent: Jul. 10, 2007

(54) GROUP AVERAGE FILTER ALGORITHM FOR DIGITAL IMAGE PROCESSING

(75) Inventors: Olivier Attia, New York, NY (US); Prateek Shrivastava, Newark, NJ (US); Roman Zastepine, Brooklyn, NY (US); Avi Outmezguine, Brookyln, NY (US)

(73) Assignee: Scanbuy, Inc., New York, NY (US)

( * ) Notice: Subject to any disclaimer, the term of this patent is extended or adjusted under 35 U.S.C. 154(b) by 79 days.

(21) Appl. No.: 10/832,319

(22) Filed: Apr. 27, 2004

(65) Prior Publication Data

US 2005/0035206 A1 Feb. 17, 2005

Related U.S. Application Data

(60) Provisional application No. 60/493,792, filed on Aug. 11, 2003.

(51) Int. Cl.
*G06K 9/38* (2006.01)
(52) U.S. Cl. .................. 382/272; 382/176; 382/172; 382/266; 235/462.01
(58) Field of Classification Search .............. 382/272
See application file for complete search history.

(56) References Cited

U.S. PATENT DOCUMENTS

| | | | | |
|---|---|---|---|---|
| 4,238,768 A | * | 12/1980 | Mitsuya et al. | 375/240.24 |
| 4,323,973 A | * | 4/1982 | Greenfield | 382/130 |
| 4,554,593 A | * | 11/1985 | Fox et al. | 358/3.24 |
| 4,774,569 A | * | 9/1988 | Morton et al. | 348/107 |
| 4,969,202 A | | 11/1990 | Groezinger | |
| 5,016,118 A | * | 5/1991 | Nannichi | 358/462 |
| 5,113,454 A | * | 5/1992 | Marcantonio et al. | 382/108 |
| 5,179,599 A | * | 1/1993 | Formanek | 382/172 |
| 5,243,443 A | * | 9/1993 | Eschbach | 358/3.03 |
| 5,243,444 A | * | 9/1993 | Fan | 358/3.08 |
| 5,276,315 A | * | 1/1994 | Surka | 235/462.1 |
| 5,327,240 A | * | 7/1994 | Golston et al. | 348/607 |
| 5,331,442 A | * | 7/1994 | Sorimachi | 358/532 |
| 5,345,317 A | * | 9/1994 | Katsuno et al. | 382/239 |

(Continued)

OTHER PUBLICATIONS

Trier, O.D., Jain, A.K., "Goal-Directed Evaluation of Binarization Methods", Pattern Analysis and Machine Intelligence, IEEE Transactions on, Dec. 1995, ISSN: 0162-8828.*

(Continued)

*Primary Examiner*—Matthew C. Bella
*Assistant Examiner*—Sath V. Perungavoor
(74) *Attorney, Agent, or Firm*—Wilmer Cutler Pickering Hale and Dorr LLP

(57) ABSTRACT

This present invention discloses a system and method for enhancing images of barcodes and other similar objects taken by the digital camera connected to or embedded in a mobile device. This filter works by converting the image into its equivalent gray scale. The algorithm then computes the mean pixel intensity value of a row of pixels in the image. The row is divided into sections and the mean pixel intensity of each section is also calculated. The pixels in each section are processed according to the relation of the relative mean intensities of the row and the section. Once each pixel has been processed, the image is reassembled from its divided sections.

3 Claims, 3 Drawing Sheets

U.S. PATENT DOCUMENTS

| | | | |
|---|---|---|---|
| 5,510,604 A * | 4/1996 | England | 235/462.25 |
| 5,767,978 A * | 6/1998 | Revankar et al. | 358/296 |
| 5,778,092 A | 7/1998 | MacLeod et al. | |
| 5,852,677 A | 12/1998 | Nakamura et al. | |
| 5,877,486 A * | 3/1999 | Maltsev et al. | 235/462.15 |
| 5,890,021 A * | 3/1999 | Onoda | 396/121 |
| 5,909,505 A * | 6/1999 | Katayama et al. | 382/164 |
| 5,915,039 A * | 6/1999 | Lorie et al. | 382/230 |
| 5,963,669 A * | 10/1999 | Wesolkowski et al. | 382/206 |
| 5,969,325 A * | 10/1999 | Hecht et al. | 235/462.16 |
| 6,045,515 A * | 4/2000 | Lawton | 600/558 |
| 6,091,511 A | 7/2000 | Dror et al. | |
| 6,101,285 A * | 8/2000 | Fan | 382/260 |
| 6,115,488 A * | 9/2000 | Rogers et al. | 382/132 |
| 6,137,898 A * | 10/2000 | Broussard et al. | 382/132 |
| 6,201,612 B1 * | 3/2001 | Matsushiro et al. | 358/1.9 |
| 6,282,307 B1 * | 8/2001 | Armato et al. | 382/132 |
| 6,347,156 B1 * | 2/2002 | Kamada et al. | 382/237 |
| 6,366,696 B1 | 4/2002 | Hertz et al. | |
| 6,650,766 B1 * | 11/2003 | Rogers et al. | 382/132 |
| 6,735,341 B1 * | 5/2004 | Horie et al. | 382/239 |
| 6,735,745 B2 | 5/2004 | Sarig | |
| 6,898,329 B1 * | 5/2005 | Takahashi | 382/272 |
| 2002/0090107 A1 * | 7/2002 | Acharya et al. | 382/100 |
| 2003/0007696 A1 * | 1/2003 | Saito | 382/239 |
| 2003/0123710 A1 * | 7/2003 | Nakazawa et al. | 382/115 |
| 2004/0042670 A1 * | 3/2004 | Moroo et al. | 382/232 |
| 2004/0101183 A1 * | 5/2004 | Mullick et al. | 382/131 |
| 2004/0240737 A1 * | 12/2004 | Lim et al. | 382/182 |

OTHER PUBLICATIONS

J. M. White and G. D. Rohorer, "Image thresholding for optical character recognition and other applications requiring character image extraction," IBM J. Res. Develop., vol. 27, No. 4, pp. 400--411, 1983.*

* cited by examiner

GROUP AVERAGE FILTER ALGORITHM FOR DIGITAL IMAGE PROCESSING

PARENT CASE TEXT

This application claims the benefit of provisional application No. 60/493,792 filed Aug. 11, 2003.

FIELD OF THE INVENTION

The present invention relates generally to the field of image enhancement algorithms. More specifically, the present invention utilizes an algorithm designed to sharpen images of barcodes to aid in decoding.

BACKGROUND OF THE INVENTION

Barcodes have been utilized for identifying and pricing objects for more than thirty years. Most typically, barcodes are used in retail to identify the item of merchandise. For example, a gallon of milk may contain a barcode that, when scanned, will notify the cashier of the price of the milk.

Yet in recent years, barcodes have acquired new purposes as computers and barcode scanners have become more portable. The circuitry required to scan a conventional one-dimensional barcode can now be housed in a device as small as a typical keychain. As a result, many mobile telephones, personal digital assistants ("PDAs"), and pagers can be retrofitted with or connected to a laser-based scanning device. This allows the mobile device to function as a scanner capable of storing hundreds or thousands of scanned barcodes.

Currently, many cell phones and mobile devices are available with built-in cameras. The explosion of the availability of affordable digital cameras and their inclusion into mobile devices is driven by several factors. One of the most important is the recent availability of inexpensive image sensors based on CMOS technology. The cameras on these devices provide a means for capturing the barcode information which was previously only accessible via a laser-based scanner. Decoding barcode images from digital cameras included in mobile devices presents several difficult problems. These problems go well beyond the challenges addressed in commercial barcode readers. Some of these problems are addressed below:

Lighting:

Most mobile devices with integrated digital cameras do not have built-in flashes and rely solely on the ambient light for illumination. This can cause the image to be underexposed or overexposed depending upon the intensity of the ambient light. Bad lighting may also cause the image to appear shadowy.

Focus:

Digital cameras for portable devices are usually designed to work at a variety of distances. The need for a wider range of focus in cameras results in a trade off between the cost of the lens component and the sharpness of a typical image.

Low-Cost Lens Components:

In order to meet cost constraints of many portable device markets, manufacturers often compromise on the optical quality of camera lenses. This can present decoding technology with a different set of challenges from the simple focal length based focus problem noted above. Low-cost lens components can produce image distortions that are localized to a specific region or form a changing gradient across the image.

Limited Resolution:

The cost of a digital imaging CMOS sensor increases as the number of image pixels increases. Although the Asian market has seen the release of general purpose consumer devices like PDAs and cell phones with "megapixel" image resolution, the European and North American markets are now only seeing their emergence. Lower resolution images contain less detail and usually require further processing to be useful.

Based on the aforementioned described problems with mobile digital imaging, there clearly exists a need for an image enhancement algorithm which can compensate for the poor images which result from these shortcomings. Such an algorithm would allow a greater number of images acquired via digital imaging techniques to be decoded.

SUMMARY OF THE INVENTION

The present invention provides an algorithm designed to apply an image-processing filter which mainly suppresses the high frequencies in the image and filters the low frequencies, thus smoothing the image and enhancing the detection of edges. First, the sharpening algorithm converts the gray-scale barcode image is broken down into a two-dimensional array. Each entry in the two-dimensional array stores the intensity of a single pixel.

The image is then converted to a grayscale image. Typically, this is done by mapping each color pixel to its equivalent in grayscale. Next, a row of pixels from the image is selected for processing. The mean intensity of the row is computed by averaging all of the pixel intensities from the row.

The row of pixels is then divided into three to ten equal sections. The number of sections can either be selected by the user or predetermined by the image processing algorithm. The mean pixel intensity of each section is also computed by averaging the pixel intensities in each section. If the mean intensity value for a section is greater than the mean intensity value for the entire row, the pixel intensities are recalculated for that section utilizing a proprietary formula. Generally, if a pixel's intensity is slightly greater than the average pixel intensity for that section, the pixel is assigned an intensity value identifying it as "white." If a pixel's intensity is slightly less than the average pixel intensity for that section, it is assigned an intensity value identifying it as "black." Pixels having an intensity value close to the mean value are typically not changed.

If the mean intensity value for a section is less than the mean intensity value for the entire row, the pixel intensities are recalculated for that section utilizing a similar proprietary formula. Generally, if a pixel's intensity is slightly greater than the average pixel intensity for that section, the pixel is assigned an intensity value identifying it as "white." If a pixel's intensity is slightly less than the average pixel intensity for that section, it is assigned an intensity value identifying it as "black." Pixels having an intensity value close to the mean value are typically not changed in this instance either.

Once each pixel in the row has been processed utilizing the above described process, the enhanced image is reconstructed by rejoining the sections of the row. The row is then available for decoding.

Therefore, it is an object of the present invention to provide a group average filter capable of sharpening a row of pixels to aid in optical decoding.

An additional object of the present invention is to provide an image enhancement algorithm which divides a row of pixels from an image into sections prior to processing.

Another object of the present invention is to provide an image enhancement algorithm which utilizes the mean intensity for the row of pixels in processing each section of the row.

It is also an object of the present invention to provide an image enhancement algorithm which converts the image to grayscale prior to processing.

These and other objects of the present will be made clearer with reference to the following detailed description and accompanying drawings.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

Figure 1:
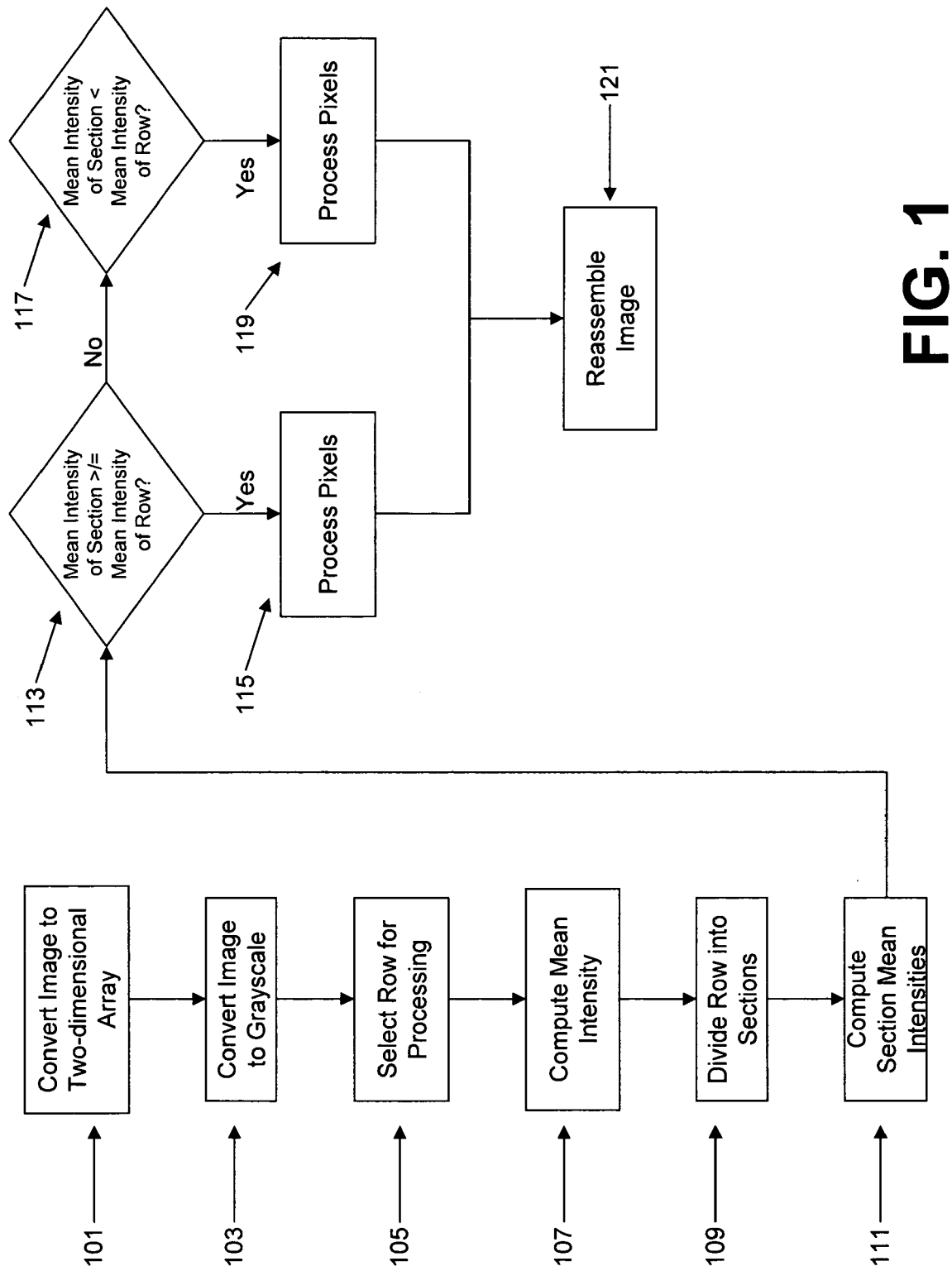
FIG. 1 depicts a flowchart showing the process utilized to sharpen an image.

With reference first to FIG. 1, shown is a flowchart depicting the steps of the image enhancement algorithm of the present invention. The image enhancement algorithm has been shown to be particularly effective for sharpening rows of pixels from a barcode image. First, the sharpening algorithm converts the barcode image into a two-dimensional array in step 101. Each entry in the two-dimensional array stores the intensity value of a single pixel. The image can now be described as a function as follows:

$$\text{Image} = \sum_{x=0}^{n-1} \sum_{y=0}^{m-1} f(x, y)$$

where n is the image width and m is the image height. The image is then converted to a grayscale image in step 103 by mapping each pixel to its grayscale representative. In the preferred embodiment, this is done utilizing a standard color to grayscale filter.

Next, a row of pixels from the image is selected for processing in step 105. The mean intensity of the row is then computed by averaging all of the pixel intensities from the row in step 107. The mean can be represented as follows:

$$\text{mean(row)} = \left(\sum_{x=0}^{n-1} pixelColor(x, y)\right) / n$$

Where n is the number of pixels in the row and y is the horizontal pixel value of the selected row.

The row of pixels is then divided into three to ten equal sections in step 109. The number of sections can either be selected by the user or predetermined by the image processing algorithm. The mean pixel intensity of each section is then computed by averaging the intensities of the pixels in each section in step 111.

If the mean pixel intensity of the section is less than the mean pixel intensity of the row as determined in step 113, the intensity of each pixel is recalculated in step 115 according to the following formula:

if pixelColor(x,y)+P*(pixelColor(x,y))>mean pixel intensity of section, then New Pixel value g(x,y) ="white," else New Pixel value g(x,y)="black-"where, $1 \leq P \leq 20$ The value of P can either be user defined or selected by the algorithm. The function "pixelcolor(x,y)" refers to the pixel intensity stored in that particular entry in the two dimensional array which defines the image. The pixel intensity values assigned to "white" and "black" depend upon the image format being used. For example, in a 256 color grayscale image, pixel intensities of zero would be assigned to "white" and 256 would be assigned to "black." Pixels having an intensity value close to the mean value are typically not changed in this instance either.

If the mean pixel intensity of the section is less than the mean pixel intensity of the row as determined in step 117, the intensity of each pixel in the section is recalculated in step 119 according to the following formula:

if, pixelColor(x,y)−P*(pixelColor(x,y))>mean pixel intensity of section, then New Pixel value g(x,y) ="white," else New Pixel value g(x, y)="black-"where, $1 \leq P \leq 20$ The value of P can either be user defined or selected by the algorithm. The function "pixelcolor(x,y)" refers to the pixel intensity stored in that particular entry in the two dimensional array which defines the image. The pixel intensity values assigned to "white" and "black" depend upon the image format being used.

Once each pixel in the row has been processed utilizing the above described process, the enhanced image is reconstructed in step 121 by rejoining the sections of the row. The row is then available for decoding.

Figure 2A:
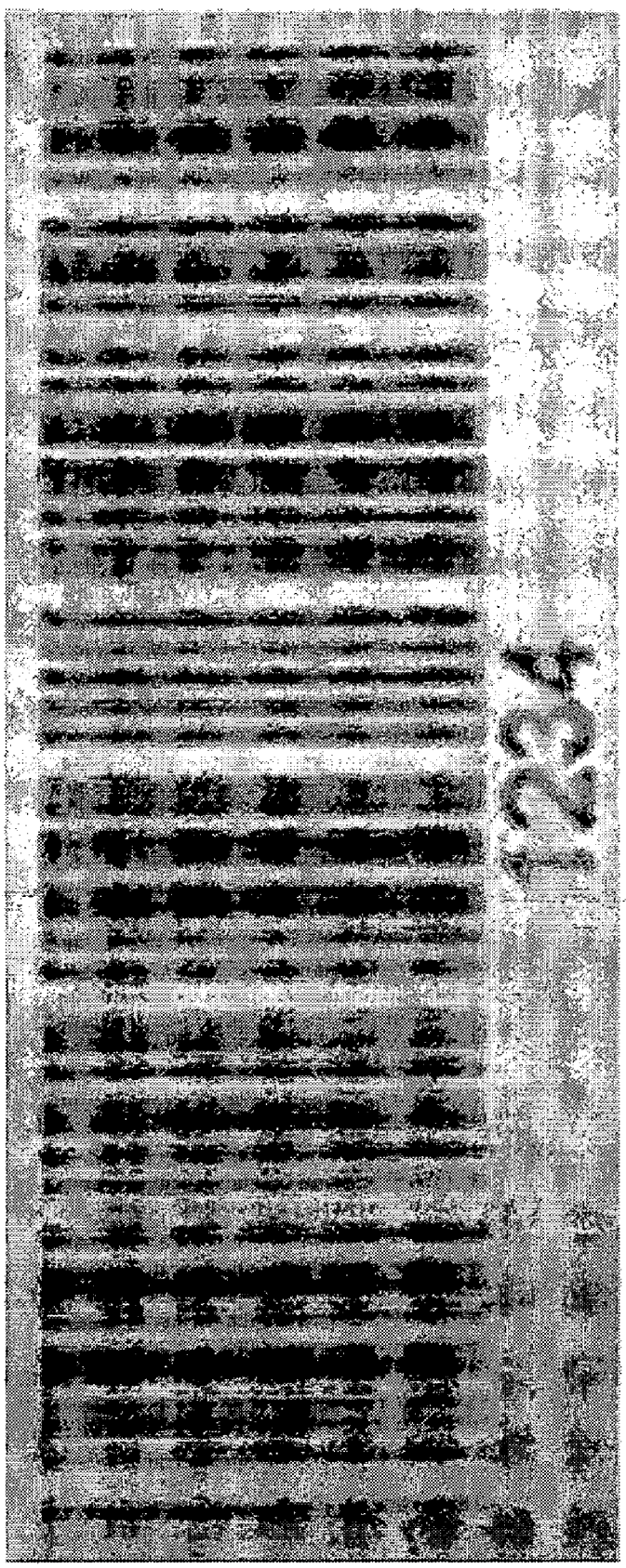
FIG. 2A depicts a typical barcode image acquired using a digital camera.
Figure 2B:
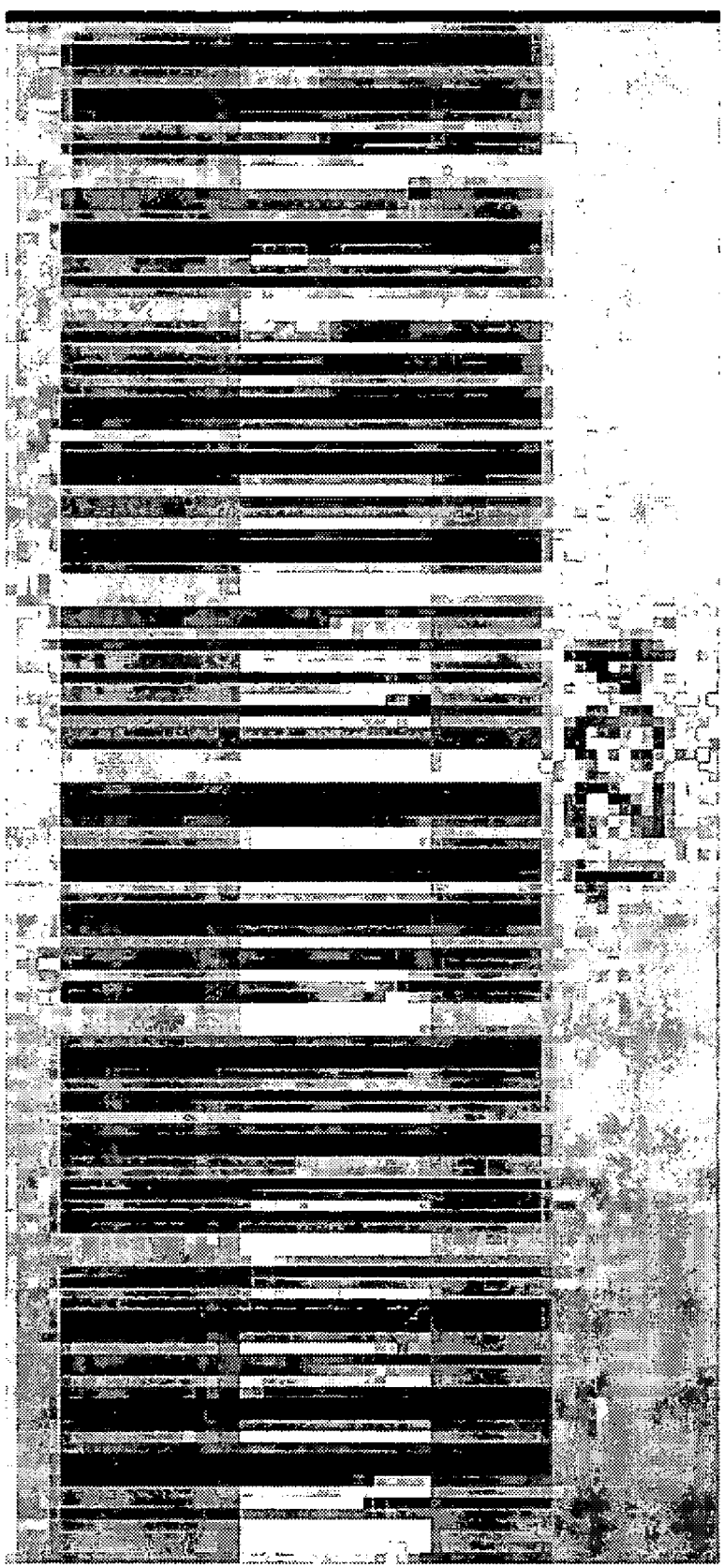
FIG. 2B depicts the barcode of FIG. 2A after it has undergone sharpening utilizing the sharpening filter of the present invention.

An example input and output barcode which have been processed by the aforementioned sharpening algorithm are shown in FIG. 2A and FIG. 2B, respectively. The rows which were processed by the algorithm of the present invention as shown in FIG. 2B have more contrast between the barcode and the background of the image as compared to the inputted image of FIG. 2A.

While the foregoing embodiments of the invention have been set forth in considerable detail for the purposes of making a complete disclosure, it should be evident to one skilled in the art that multiple changes may be made to the aforementioned description without departing from the spirit of the invention.

We claim:

1. A method of enhancing an image comprising the steps of:
   converting the image to a two-dimensional array;
   converting said image to grayscale;
   selecting a row of pixels from said image for processing;
   computing the mean intensity of said pixels in said row;
   dividing said image into sections;
   computing the mean intensity of the pixels of each section;

processing the pixels in each of said sections according to a first method if said mean intensity of said section is greater than said mean intensity of said row;

processing the pixels in each of said sections according to a second method if said mean intensity of said section is less than said mean intensity of said row; and disregarding the pixels in sections where said mean intensity of said section is equal to said mean intensity of said row; and wherein said first method of processing pixels in a section consists of the steps of:

computing the value of the intensity of each pixel in said section plus a percentage threshold multiplied by the intensity of each pixel in said section; and assigning to each pixel in said section an intensity corresponding to white if the computed value is greater than the mean intensity of said row; and assigning to each pixel in said section an intensity corresponding to black if the computed value is less than the mean intensity of said row; and wherein said second method of processing pixels in a section consists of the steps of:

computing the value of the intensity of each pixel in said section minus a percentage threshold multiplied by the intensity of each pixel in said section; and assigning to each pixel in said section an intensity corresponding to white if the computed value is greater than the mean intensity of said row; and assigning to each pixel in said section an intensity corresponding to black if the computed value is less than the mean intensity of said row; and wherein said percentage threshold is greater than or equal to one and less than or equal to twenty.

2. A method for enhancing an image according to claim 1, further comprising the step of:

reassembling said image after said sections have been processed.

3. A method for enhancing an image according to claim 1, wherein each row of said image is enhanced.

* * * * *